United States Patent
Byun et al.

(10) Patent No.: US 8,603,669 B2
(45) Date of Patent: Dec. 10, 2013

(54) PROTECTION CIRCUIT ASSEMBLY AND BATTERY PACK HAVING THE SAME

(75) Inventors: Jeong-Deok Byun, Suwon-si (KR); Seok Koh, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1062 days.

(21) Appl. No.: 12/285,947

(22) Filed: Oct. 16, 2008

(65) Prior Publication Data

US 2009/0155632 A1    Jun. 18, 2009

(30) Foreign Application Priority Data

Dec. 13, 2007 (KR) .................. 10-2007-0129872

(51) Int. Cl.
*H01M 14/00* (2006.01)
*H05K 1/11* (2006.01)

(52) U.S. Cl.
USPC ........... 429/175; 429/163; 429/170; 429/182; 429/181

(58) Field of Classification Search
USPC .................................. 429/161–186
See application file for complete search history.

(56) References Cited

U.S. PATENT DOCUMENTS

| | | | |
|---|---|---|---|
| 7,462,417 B2 | 12/2008 | Moon | |
| 7,510,791 B2 | 3/2009 | Moon et al. | |
| 7,537,720 B2 | 5/2009 | Moon | |
| 7,622,219 B2 | 11/2009 | Ota et al. | |
| 7,824,798 B2 * | 11/2010 | Bang | 429/178 |
| 7,976,969 B2 * | 7/2011 | Kim et al. | 429/7 |
| 2002/0133209 A1 * | 9/2002 | O'Phelan et al. | 607/36 |
| 2005/0208345 A1 * | 9/2005 | Yoon et al. | 429/7 |
| 2005/0208346 A1 * | 9/2005 | Moon et al. | 429/7 |

FOREIGN PATENT DOCUMENTS

| | | |
|---|---|---|
| CN | 1783535 | 6/2006 |
| CN | 1890824 | 1/2007 |

(Continued)

OTHER PUBLICATIONS

Korean Office Action issued on Sep. 26, 2009 in the corresponding Korean Patent Application No. 10-2007-0129872.

(Continued)

*Primary Examiner* — Milton I Cano
*Assistant Examiner* — Stephen Yanchuk
(74) *Attorney, Agent, or Firm* — Robert E. Bushnell, Esq.

(57) ABSTRACT

A protection circuit assembly and a battery pack including the same, which can simplify a manufacturing process and increase productivity. The protection circuit assembly includes a protection circuit board including a connection terminal, and a first lead plate connected to the connection terminal and having a coupling hole. The battery pack includes a bare cell having a protrusion, and a protection circuit assembly electrically connected with the bare cell and including a first lead plate having a coupling hole. Accordingly, the battery pack includes a protection circuit assembly including a lead plate having a coupling hole, and a bare cell including a structure inserted into the coupling hole, and thus it is possible to simplify a manufacturing process and increase productivity.

11 Claims, 4 Drawing Sheets

(56) References Cited

FOREIGN PATENT DOCUMENTS

| CN | 1914749 A | 2/2007 |
|---|---|---|
| CN | 1918726 A | 2/2007 |
| CN | 1985387 A | 6/2007 |
| JP | 2005-259388 | 9/2005 |
| JP | 2006-313741 | 11/2006 |
| KR | 10-2005-0081175 | 8/2005 |
| KR | 10-2006-0034180 | 4/2006 |
| KR | 10-0571272 B | 4/2006 |
| KR | 10-2006-0046292 | 5/2006 |
| KR | 10-2008-0049645 A | 6/2008 |

OTHER PUBLICATIONS

Korean Notice of Allowance issued by Korean Patent Office on Mar. 15, 2010 corresponding Korean Patent Application No. 10-2007-0129872 and Request for Entry of the Accompanying Office Action attached herewith.

Chinese Office Action issued on Jul. 30, 2010 for corresponding Chinese Patent Application No. 200810185548.2 with English translation.

Chinese decision of rejection issued by Chinese Patent Office on Jun. 15, 2011, corresponding to Chinese Patent Application No. 2008101855482 and its English Translation attached herewith.

* cited by examiner

PROTECTION CIRCUIT ASSEMBLY AND BATTERY PACK HAVING THE SAME

CLAIM OF PRIORITY

This application makes reference to, incorporates the same herein, and claims all benefits accruing under 35 U.S.C. §119 from an application for PROTECTION CIRCUIT ASSEMBLY AND BATTERY PACK HAVING THE SAME earlier filed in the Korean Intellectual Property Office on 13 Dec. 2007 and there duly assigned Serial No. 2007-0129872.

BACKGROUND OF THE INVENTION

1. Field of the Invention

The present invention relates to a protection circuit assembly and a battery pack including the same, and more particularly, to a protection circuit assembly and a battery pack including the same, which simplifies the manufacturing process and increases/improves productivity.

2. Description of the Related Art

Secondary batteries are more economical than disposable batteries since they are rechargeable.

Moreover, in recent time, since secondary batteries are getting smaller and have higher capacity, they are widely used as power sources of handheld electronic/electrical appliances such as mobile phones, camcorders and notebook computers.

Such secondary batteries include nickel-cadmium batteries, nickel-metal hydride batteries, nickel-zinc batteries and lithium secondary batteries.

Among the secondary batteries, a lithium secondary battery is widely used due to its compact size, high capacity, high operating voltage and higher energy density per unit weight than other batteries.

The lithium secondary battery is classified into a can type and a pouch type according to the shape of an outer casing for accommodating an electrode assembly including a positive electrode plate, a negative electrode plate and a separator, and the can type may be sub-classified into a cylinder type and a prismatic type.

In the can-type lithium secondary battery, an outer casing is generally formed of a metal such as aluminum, and formed in a cylinder shape, a prism shape or a rod shape having rounded corners.

An opening is formed in an upper portion of a can, an electrode assembly is inserted into the can through the opening, and then an electrolyte is injected to fill the can.

Subsequently, the can is sealed with a cap assembly having the size and shape corresponding to the opening formed in the upper portion of the can, and thus a sealed bare cell is completed.

In the pouch-type lithium secondary battery, an outer casing has an electrode assembly on a lower surface of the pouch casing having a space for accommodating the electrode assembly.

Subsequently, an upper surface of the pouch casing covers the lower surface of the pouch casing, and sealing portions formed along edges of the upper and lower surfaces of the pouch casing are joined to each other to seal the casing, and thus a bare cell is formed.

The bare cell is electrically connected with a protection circuit board including a protection device to prevent damage to the battery due to abnormal operations such as overcharging, overdischarging or overcurrent.

In general, the bare cell and the protection circuit board are electrically connected with each other using a lead terminal, and thus a battery pack is formed.

In the prismatic-type secondary battery, an electrical connection between a bare cell and a protection circuit board is made by connecting a cap plate and an electrode terminal of the bare cell with positive and negative electrode terminals of the protection circuit board using a lead terminal.

Here, the cap plate is formed of aluminum, or an aluminum alloy, and the lead terminal is formed of nickel having high conductivity.

Since it is difficult to resistance-weld these different metals, the connection between the cap plate and the lead terminal may be made by laser welding.

Therefore, production costs increase due to such expensive laser welding.

The above information disclosed in this Related Art section is only for enhancement of understanding of the background of the invention and therefore it may contain information that does not form the prior art that is already known to a person of ordinary skill in the art.

SUMMARY OF THE INVENTION

The present invention provides a protection circuit assembly and a battery pack including the same, which can simplify a manufacturing process and increase productivity.

According to one aspect of the present invention, a protection circuit assembly includes a protection circuit board including a connection terminal, and a first lead plate connected to the connection terminal and having a coupling hole.

According to another aspect of the present invention, a battery pack includes a bare cell having a protrusion, and a protection circuit assembly electrically connected with the bare cell and including a first lead plate having a coupling hole.

The bare cell may include: a can having an opening; an electrode assembly accommodated in the can; and a cap assembly covering the opening, and including a cap plate having a protrusion and an electrode terminal.

The coupling hole may be coupled with the protrusion. The protrusion may have an embossed shape at a portion to be in contact with the coupling hole.

One of UV irradiation, soldering and spot welding may be further performed at the part in which the coupling hole is coupled with the protrusion.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
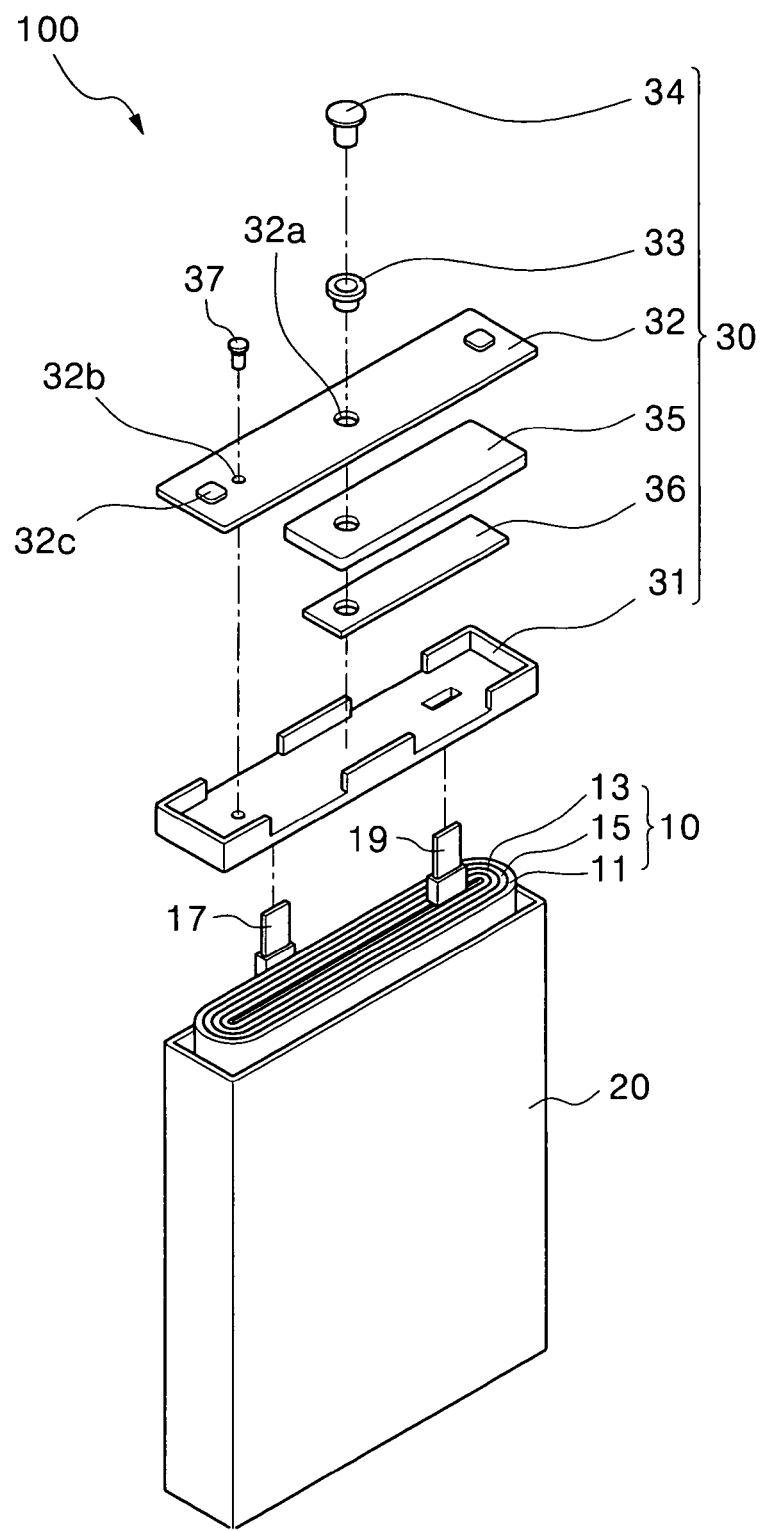
FIG. 1A is an exploded perspective view of a bare cell according to an exemplary embodiment of the present invention.

The above and other objects, features and functions of the present invention will be described more fully with reference to the accompanying drawings.

Moreover, in the drawings, the lengths and thicknesses of a layer and a region may be exaggerated for clarity. Also, like numerals denote like elements throughout the specification.

Figure 1B:
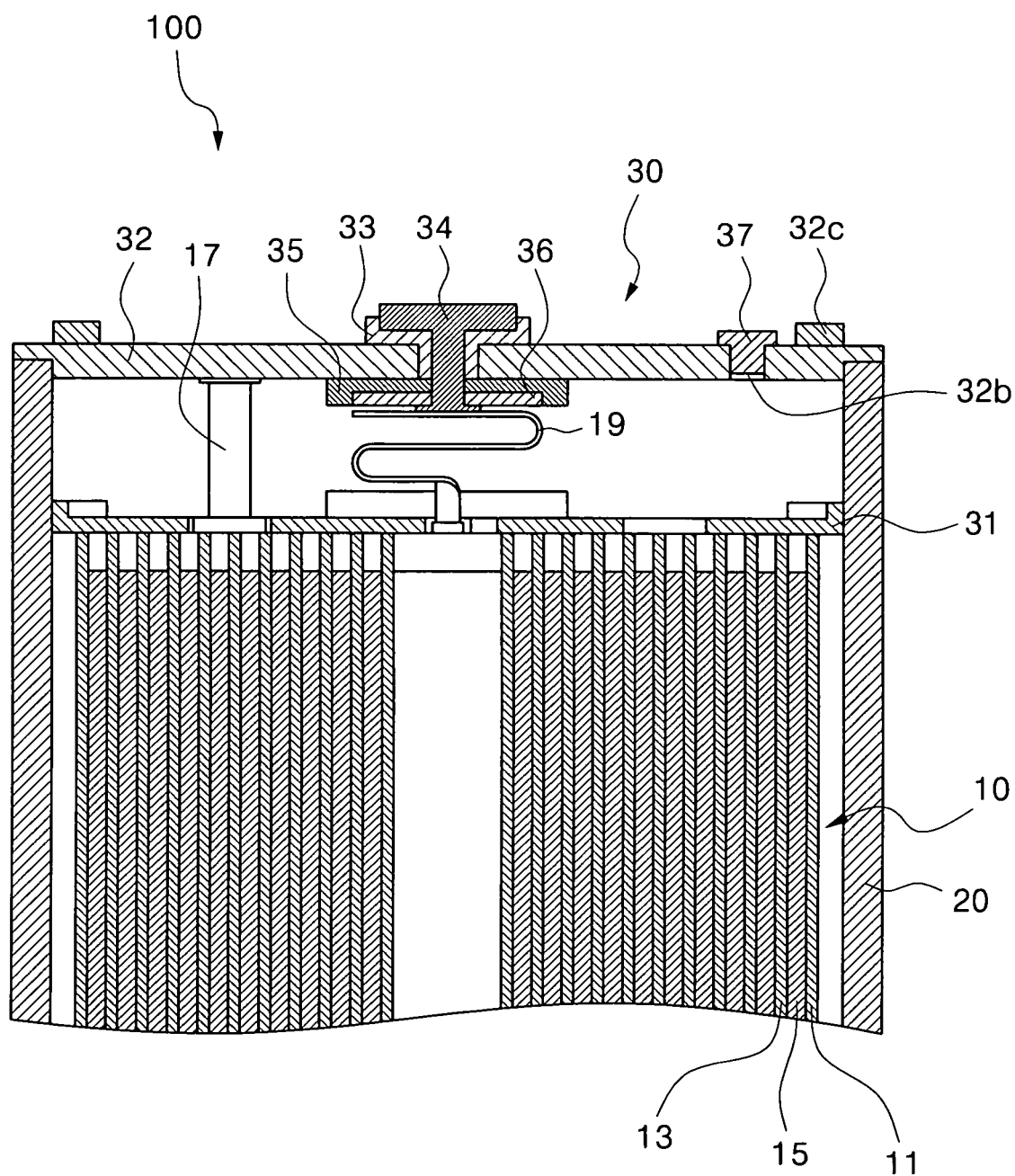
FIG. 1B is an assembled cross-sectional view of the bare cell of FIG. 1A.

FIGS. 1A and 1B are exploded perspective and assembled cross-sectional views of a bare cell according to an exemplary embodiment of the present invention, respectively.

Referring to FIGS. 1A and 1B, a bare cell 100 includes an electrode assembly 10, a can 20 for accommodating the electrode assembly 10, and a cap assembly 30 disposed on an opening of the can 20.

The electrode assembly 10 includes a positive electrode plate 11 formed by applying a positive electrode active material to a positive electrode collector, a negative electrode plate 13 formed by applying a negative electrode active material to a negative electrode collector and a separator 15 interposed between the positive electrode plate 11 and the negative electrode plate 13 to prevent a short circuit between two electrode plate 11 and 13 and to facilitate the migration of lithium ions.

A positive electrode non-coating portion is formed on the positive electrode plate 11, and a negative electrode non-coating portion is formed on the negative electrode plate 13.

A positive electrode tab 17 electrically connected with a cap plate is joined to the positive electrode non-coating portion, and a negative electrode tab 19 electrically connected with an electrode terminal is joined to the negative electrode non-coating portion.

Here, the positive electrode tab 17 and the negative electrode tab 19 may be joined to the positive and negative electrode non-coating portions by ultra-sonic welding, but the present invention is not limited thereto.

The positive electrode collector may be formed of stainless steel, nickel, aluminum, titanium or an alloy thereof, or carbon-, nickel-, titanium- or silver-treated aluminum or stainless steel, and preferably aluminum or an aluminum alloy.

The negative electrode collector may be formed of stainless steel, nickel, copper, titanium or an alloy thereof, or carbon-, nickel-, titanium- or silver-treated cooper or stainless steel, and preferably copper or a copper alloy.

The separator 15 may be generally formed of a thermoplastic resin such as polyethylene (PE) or polypropylene (PP), and has a porous surface.

The porous separator 15 is melted at a temperature around a melting point of the thermoplastic resin due to an increase in internal temperature of the battery, and thus the porosity is blocked to be an insulating film.

Thus, the migration of lithium ions between the positive and negative electrode plates 11 and 13 is interrupted to block the flow of current, thereby stopping an increase in internal temperature of the battery.

The can 20 may be formed of a metallic material having an opening at an upper portion thereof, and accommodate the electrode assembly 10 and an electrolyte. The can 20 may also accommodate an insulating case over the electrode assembly.

The metallic material may include aluminum, an aluminum alloy or stainless steel, which is light and flexible, and when the can 20 is formed of such a metallic material, it may have a polarity, and thus may be used as an electrode terminal.

The shape of the can 20 may be prismatic or oval, and the open upper portion of the can 20 is welded or thermally fused with a cap plate to be sealed.

The cap assembly 30 includes an insulating case 31, a cap plate 32, a gasket 33, an electrode terminal 34, an insulating plate 35, a terminal plate 36 and an electrolyte inlet plug 37.

The insulating case 31 is disposed on the electrode assembly 10 which is inserted into the can 20 to prevent the movement of the electrode assembly 10.

The insulating case 31 has an edge serving as a wall to fasten the terminal plate 36 and the insulating plate 35 covering the terminal plate 36.

The cap plate 32 is connected to the opening of the can 20 to seal the opening, has the size and shape corresponding to the opening, and has a through-hole 32a into which the gasket 33 and the electrode terminal 34 are inserted.

Further, an electrolyte inlet 32b serving as a passage for injecting an electrolyte into the can 10 is formed in the cap plate 32, and is sealed by the electrolyte inlet plug 37.

A protrusion 32c is formed on an upper surface of the cap plate 32, which may be integrated with the cap plate 32. The protrusion 32c may be separately formed and then attached to the cap plate 32.

The protrusion 32c is connected with a coupling hole formed in a lead plate for connection between the protection circuit board and the bare cell, to physically join the protection circuit board and the bare cell and make an electrical path.

A contact part of the protrusion 32c which is in contacted with the lead plate may be embossed, which results in a stronger connection.

The gasket 33 is connected to the through-hole 32a formed in the cap plate 32, and formed of an insulating material to insulate the electrode terminal 34 from the cap plate 32.

Further, in the middle of the gasket 33, a hole is formed to be connected with the electrode terminal 34.

The electrode terminal 34 is connected with the cap plate 32 through the hole formed in the gasket 33, and the lower portion of the electrode terminal 34 is connected with the terminal plate 36 through the cap plate 32.

The insulating pate 35 is disposed under the cap plate 32 to insulate an outer surface of the terminal plate 36, and has a hole to connect the electrode terminal 34 with the terminal plate 36.

The terminal plate 36 is disposed under the insulating plate 35, and formed of a conductive material to be connected with the electrode terminal 34, thereby making an electrical path.

Figure 2A:
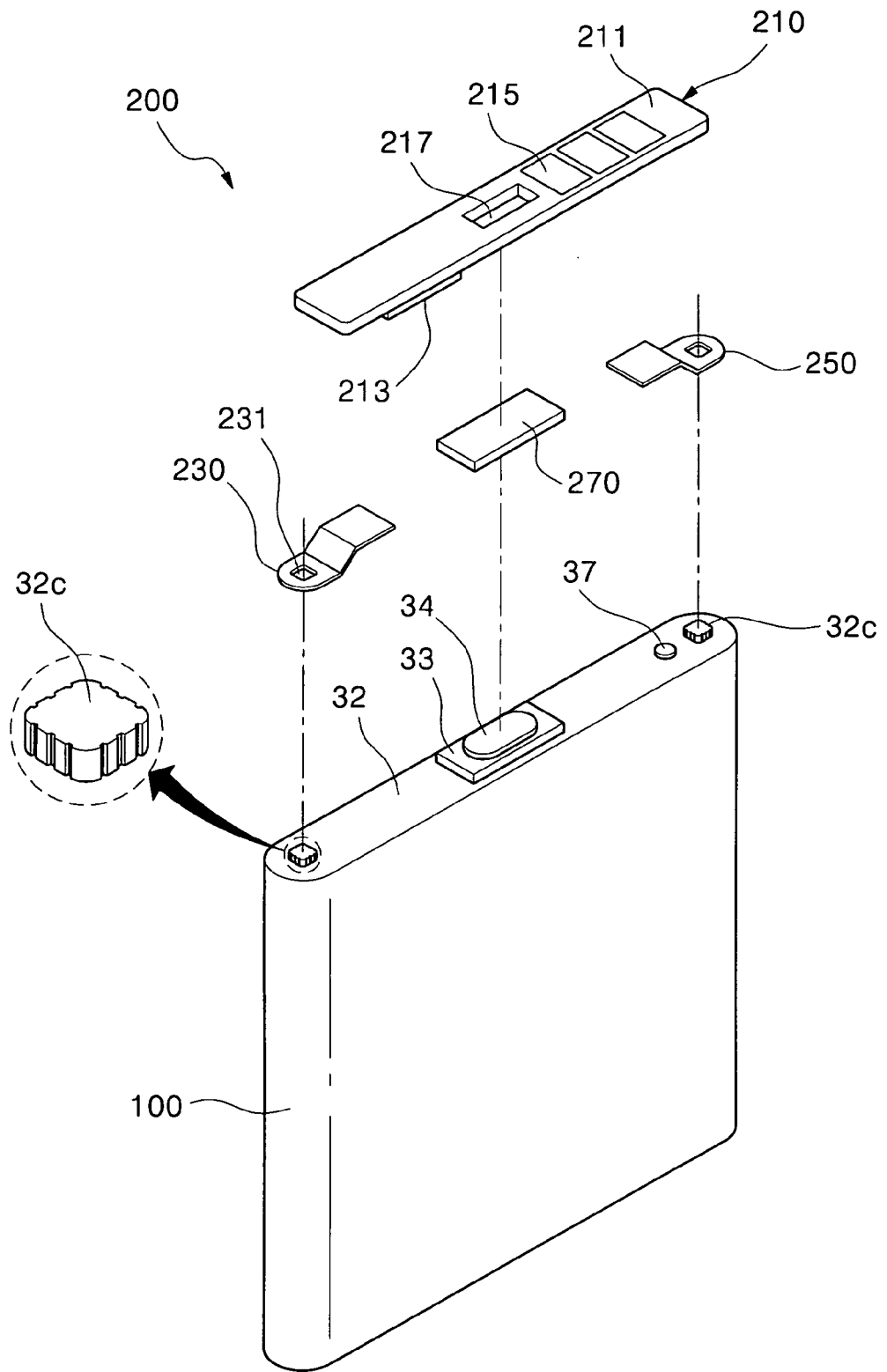
FIG. 2A is an exploded perspective view of a battery pack according to an exemplary embodiment of the present invention.
Figure 2B:
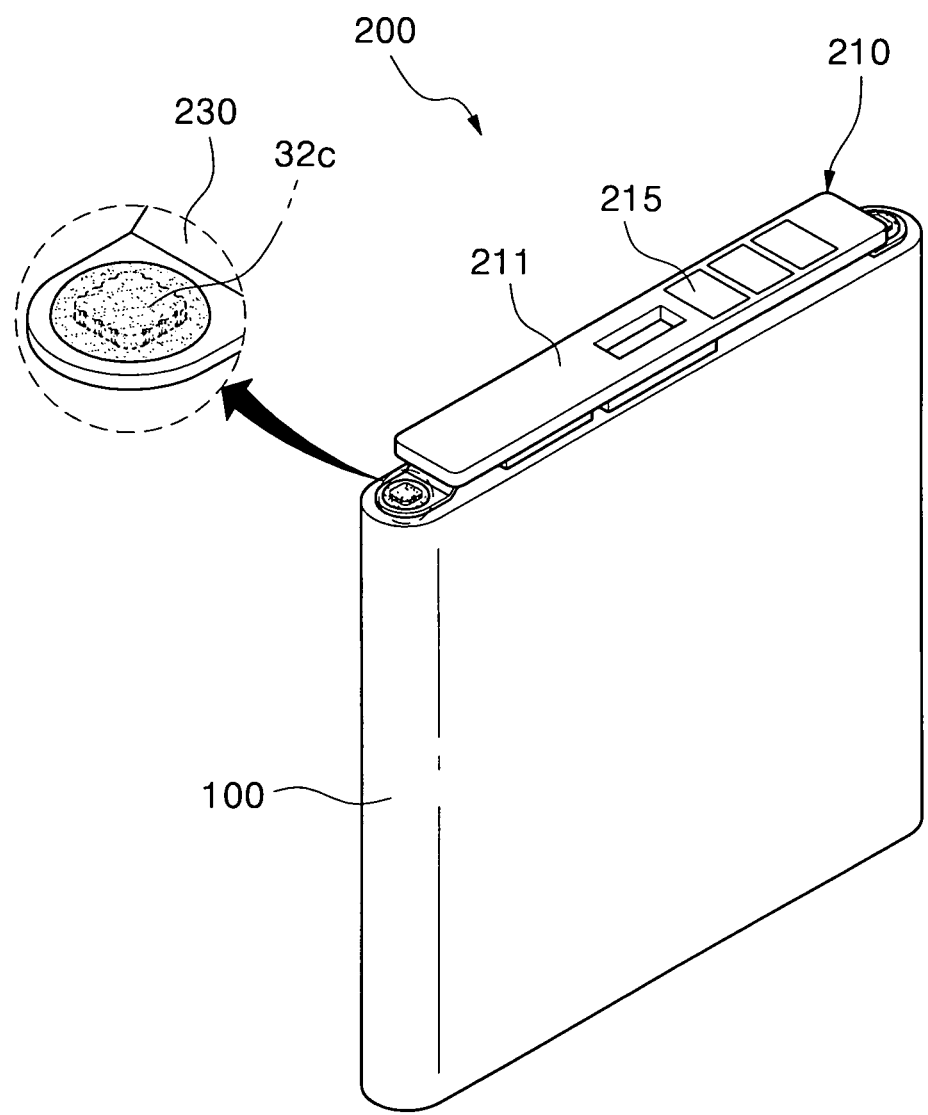
FIG. 2B is an assembled perspective view of the battery pack of FIG. 2A.

FIGS. 2A and 2B are exploded and assembled perspective views of a battery pack according to an exemplary embodiment of the present invention, respectively.

Referring to FIGS. 2A and 2B, a battery pack includes a bare cell 100, and a protection circuit assembly 200 disposed at one side of the bare cell 100.

The bare cell 100 has the structure illustrated with reference to FIGS. 1A and 1B, and an electrode terminal 34 insulated from a cap plate 32 by a gasket 33, an electrolyte inlet plug 37 for covering an electrolyte inlet and a protrusion 32c protruding from the cap plate 32 to be in contact with a lead plate are disposed at the upper surface of the bare cell 100.

The protection circuit assembly 200 includes the protection circuit board 210 and several lead plates 230, 250 and 270 to make an electrical connection with the bare cell 100.

The protection circuit board 210 includes a printed circuit board 211 having interconnection patterns formed therein, a safety device 213 and a connection terminal to be connected with a lead plate are mounted on one side of the printed circuit board 211, and at least one external connection terminal 215 to be connected with external electrical/electronic appliances is mounted on the other side of the printed circuit board 211.

Further, a hole 217 is formed in the printed circuit board 211 to correspond to the electrode terminal 34 provided in the bare cell 100 to serve as a passage when welding the bare cell 100 and the protection circuit board 200. Thus, the passage may be formed in any size in which the welding process is available.

The lead plate connected to the connection terminal of the protection circuit board 210 includes external lead plates 230 and 250 having a coupling hole 231 corresponding to the protrusion 32c formed in the cap plate 32 of the bare cell 100, and an internal lead plate 270 connected to the corresponding electrode terminal 34 of the bare cell 100. The lead plates are generally formed of nickel, which has high conductivity.

The external lead plates 230 and 250 are physically coupled with the bare cell 100 by fastening the coupling hole 231 to the protrusion 32c formed on the cap plate 32 of the bare cell 100, thereby making an electrical path.

Two external lead plates may be provided as in the present embodiment, all of which may be used as electrode lead plates for forming an electrical path.

Alternatively, one external lead plate may be used as an electrode lead plate, and the other one may be used as an auxiliary lead plate to maintain a gap between the bare cell 100 and the protection circuit board 210.

The coupling hole 231 formed in the external lead plate may have a polygonal shape, for example, a tetragonal shape, and its shape and size correspond to protrusion 32c formed on the cap plate 32, but they can be changed and modified in various ways if the connection between the coupling hole 231 and the protrusion 32c is tight.

After the connection, UV irradiation, soldering or spot welding may be further performed to reinforce the connection strength of the contact part between the protrusion 32c and the coupling hole 231.

The internal lead plate 270 is formed of planar nickel, one side of which is connected with the electrode terminal 34 of the bare cell 100, and the other of which is connected with the connection terminal of the protection circuit board 210, thereby making an electrical path.

One side of the internal lead plate 270 is joined to the connection terminal of the protection circuit board 210 in the form of covering a hole 217 to be welded outside through the hole 217 formed in the protection circuit board 210.

And, the other side of the internal lead plate 270 is joined to the electrode terminal 34 of the bare cell 100 by spot welding through the hole 217.

The bare cell 100 and the protection circuit assembly 200 may constitute a hard pack-type battery pack which is encased in an external case, or an inner pack-type battery pack which fills a gap with hot-melted resins or couples to the upper portion of the protection circuit board using an upper case and then tubes and labels with a thin exterior material.

Consequently, a battery pack according to the present invention includes a protection circuit assembly including a lead plate having a coupling hole, and a bare cell including a structure inserted into the coupling hole, and thus it is possible to simplify a manufacturing process and increase productivity.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A battery pack, comprising:
a bare cell including a can having an opening, an electrode assembly disposed in the can and a cap assembly disposed on the opening of the can, the electrode assembly including a first electrode plate and a second electrode plate, the cap assembly including an electrode terminal electrically connected with the first electrode plate and a cap plate electrically connected with the second plate;
a protrusion disposed at ends of the cap plate, the protrusion extending from the surface of the cap plate; and
a protection circuit assembly disposed above the surface of the cap plate, the protection circuit assembly including an external lead plate electrically connected with the cap plate, and an internal lead plate electrically connected with the electrode terminal,
wherein the external lead plate includes a coupling hole coupling with the protrusion, and
wherein a vertical distance between the bare cell and the protection circuit assembly is same as a vertical distance of the external lead plate,
wherein the protrusion includes a first protrusion disposed at an end of the cap plate, and a second protrusion disposed at another end of the cap plate,
wherein the external lead plate includes a first external lead plate having a first coupling hole coupling with the first protrusion and a second external lead plate having a second coupling hole coupling with the second protrusion, and
wherein a distance between the first and second protrusion is greater than a length of the protection circuit board.

2. The battery pack according to claim 1, wherein the internal lead plate of the protection circuit assembly is formed of planar nickel.

3. The battery pack according to claim 1, wherein the internal lead plate disposed above the electrode terminal of the cap plate.

4. The battery pack according to claim 2, wherein the internal lead plate is welded to the electrode terminal.

5. The battery pack according to claim 1, wherein the protrusion has an embossed shape at a portion to be in contact with the coupling hole.

6. The battery pack according to claim 1, wherein the protrusion has the same size and shape as the coupling hole.

7. The battery pack according to claim 1, wherein the protrusion is integrally formed with the cap plate.

8. The battery pack according to claim 1, wherein the protrusion is separately formed and attached to the cap plate.

9. The battery pack according to claim 1, wherein the can is formed in a prismatic shape or an oval shape having rounded corners.

10. The battery pack according to claim 3, wherein one of UV irradiation, soldering and spot welding is further performed at the part in which the coupling hole is coupled with the protrusion.

11. A battery pack comprising:
a can having an opening;
an electrode assembly contained in the can, the electrode assembly including a first electrode plate and a second electrode plate;
a cap assembly disposed on the opening of the can, the cap assembly including an electrode terminal electrically connected with the first electrode plate, and a cap plate electrically connected with the second electrode plate;
a first protrusion located at one end of the cap plate, the first protrusion extending above a surface of the cap plate;
a second protrusion at another end of the cap plate, the second protrusion extending above said surface of the cap plate;
a protection circuit board disposed above the cap assembly, the protection circuit board including a hole exposing the electrode terminal of the cap assembly;
an internal lead plate including a first side connected with the electrode terminal and a second side connected with the protection circuit board, the internal lead plate disposed under the hole of the protection circuit board;

a first external lead plate disposed between the cap plate of the cap assembly and the protection circuit board, the first lead plate including a first coupling hole coupled with the first protrusion; and a second external lead plate disposed between the cap assembly and the protection circuit board, the second lead plate including a second coupling hole coupled with the second protrusion, and wherein a distance between the first and second protrusion is greater than a length of the protection circuit board.

* * * * *